United States Patent [19]

Dressnandt et al.

[11] Patent Number: 5,571,554

[45] Date of Patent: Nov. 5, 1996

[54] PROCESS FOR REDUCING THE CONTENT OF TRIGLYCERIDES IN EGG YOLK AND IN PRODUCTS CONTAINING EGG YOLK

[75] Inventors: Gunter Dressnandt, München; Manfred Amann, Odelzhausen; Jodoca Rockinger-Mechlem, Gilching, all of Germany

[73] Assignee: Consortium fur elektrochemische, München, Germany

[21] Appl. No.: 303,069

[22] Filed: Sep. 8, 1994

[30] Foreign Application Priority Data

Sep. 16, 1993 [DE] Germany .......................... 43 31 565.8

[51] Int. Cl.$^6$ .............................. A23L 1/015; A23L 1/32
[52] U.S. Cl. ..................... 426/614; 426/417; 426/422; 426/480
[58] Field of Search ................................... 426/614, 422, 426/425, 480, 417

[56] References Cited

U.S. PATENT DOCUMENTS

| 3,607,304 | 9/1971 | Levin . | |
|---|---|---|---|
| 4,980,180 | 12/1990 | Cully et al. . | |
| 5,063,077 | 11/1991 | Vollbrecht et al. . | |
| 5,232,725 | 8/1993 | Roderbourg et al. . | |
| 5,292,546 | 3/1994 | Cully et al. | 426/614 |
| 5,342,633 | 8/1994 | Cully et al. | 426/614 |

FOREIGN PATENT DOCUMENTS

| 2058038 | 6/1992 | Canada . |
|---|---|---|
| 0387708 | 11/1991 | European Pat. Off. . |
| 0492475 | 7/1992 | European Pat. Off. . |
| 3429703 | 2/1996 | Germany . |

OTHER PUBLICATIONS

Derwent Abstract 86–049249 of DE 34 29 703.
Database WPI, Week 8751, Derwent Publications Ltd., London, GB; AN 87–359752 & JP-A-62263143 (KAO Corp.), Nov. 16, 1987.
Database WPI, Week 7710, Derwent Publications Ltd. London, GB: AN 77–17257Y & JP-A-52 010 448 (Teijin KK et al.) Jan. 26, 1977.
Food Science and Technology Abstracts AN–92:13111 DN–92–09–N0051 International Food Information Service Berkshire, Reading, GB.
K. Shimada et al.: "Structure of inclusion complexes of cyclodextrins with triglyceride at vegetable oil/water interface" & Journal of Food Science, vol. 57 No. 3, 1992, pp. 655–656.
Database WPI, Week 9127, Derwent Publications Ltd., London, GB; AN 91–198602 & JP-A-3 124 795 (I. Furuya), May 28, 1991.

*Primary Examiner*—Anthony J. Weier
*Attorney, Agent, or Firm*—Collard & Roe, P.C.

[57] ABSTRACT

A process for reducing the content of triglycerides in egg yolk and in products containing egg yolk includes (a) diluting egg yolk with water or an aqueous salt solution, (b) adding at least one cyclodextrin to this solution, (c) separating off the cyclodextrin/triglyceride complex from this mixture, and (d) separating off to the respective desired extent the added water or the added salt solution from the egg yolk thus treated.

6 Claims, No Drawings

PROCESS FOR REDUCING THE CONTENT OF TRIGLYCERIDES IN EGG YOLK AND IN PRODUCTS CONTAINING EGG YOLK

BACKGROUND OF THE INVENTION

1. Field of the Invention

The present invention relates to a process for reducing the content of triglycerides in egg yolk and in products containing egg yolk.

2. The Prior Art

Since an association between a triglyceride-rich diet and a number of symptoms and medical disorders is taken to be confirmed, a possible way to prevent a number of medical disorders is to decrease the daily supply of these substances by reducing the triglyceride content in foods.

An important constituent of many foods which, moreover, is extremely rich in triglycerides, is egg yolk. The majority of these triglycerides is present in the form of mixed glycerol esters of saturated (approximately 30 to 35% by weight) and monounsaturated fatty acids (45% by weight). It is therefore desirable to reduce the triglyceride content of the egg yolk, in particular the content of glycerol esters containing saturated fatty acids.

A number of processes are known for reducing the triglyceride content in egg yolk. All these processes use organic solvents for reducing the triglyceride content.

The following processes may be mentioned by way of example.

The reduction of the triglyceride content using nonpolar solvents such as pentane, hexane or ether is disclosed by DE-A-3,429,703. A reduction of the triglyceride content by 80% to 95% is achieved.

Reduction of the triglyceride content using dichloroethylene is disclosed by U.S. Pat. No. 3,607,304.

The known processes have the disadvantage that a large number of technical resources are required to carry them out. Thus, handling solvents requires particular technical measures such as explosion prevention measures.

Furthermore, there is always the risk with these processes that solvent residues hazardous to health remain. Thus, chlorinated solvents, because of possible adverse effects on health, should as far as possible no longer be used at all.

In order to remove the solvents as completely as possible, elevated temperatures are required. These can lead to changes in the food, for example, of a taste or nutritional type of change.

It is a further disadvantage that the known extraction techniques are unselective, i.e., when they are employed, essential nutrient constituents are also always separated off.

SUMMARY OF THE INVENTION

It is an object of the present invention to provide an economically expedient process which is harmless to health and which avoids the disadvantages of the prior art, and which makes possible with a low level of technological resources the reduction of the triglyceride content of the egg yolk and of products containing egg yolk.

The above object is achieved according to the present invention by providing a process comprising (a) diluting egg yolk with water or an aqueous salt solution to produce a mixture; (b) adding at least one cyclodextrin to this mixture; (c) separating off the cyclodextrin/triglyceride complex from this mixture; and (d) separating off to the respective desired extent the added water or the added salt solution from the egg yolk thus treated.

The addition of cyclodextrins to egg yolk is disclosed DE-3,928,258 (equivalent to U.S. Pat. No. 5,063,077). However, for the reasons below, it is astonishing and unexpected that triglycerides can be removed from the egg yolk by means of the process according to the present invention.

It was the object of DE-3,928,258 (equivalent to U.S. Pat. No. 5,063,077) to make available a process which makes possible a selective reduction of the cholesterol content in egg yolk and which, inter alia, does not show the disadvantages of the prior art. A disadvantage of the prior art cited is that triglycerides are coextracted in the cholesterol reduction by means of high-pressure $CO_2$ extraction (U.S. Pat. No. 5,063,077, column 1, lines 47 and 48; and DE-3,928,258, column 1, line 44). By this, according to DE-3,928,258 (U.S. Pat. No. 5,063,077), the selective reduction of the cholesterol content is exclusively to be expected by addition of cyclodextrins to egg yolk. According to DE-3,928,258, it is not to be expected that an economically expedient reduction of the triglyceride content in egg yolk is possible by addition of cyclodextrin to egg yolk. Rather, those skilled in the art, owing to DE-3,928,258, will more likely refrain from corresponding experiments, since the triglyceride reduction is mentioned there as a disadvantage of the prior art to be avoided, which disadvantage is actually to be avoided by the process disclosed there.

To carry out the process according to the invention, the egg yolk is preferably diluted with water or an aqueous salt solution in the weight ratio of 1:1 to 1:6, based on the egg yolk weight used.

The aqueous salt solutions used can, in principle, be solutions of many salts permitted by the Food Act. The solutions can also be formed in situ by separate addition of salt and water to the egg yolk.

Solutions of salts which decompose into volatile components on heating are preferably used. Examples of such salts which may be mentioned are ammonium carbonate and ammonium bicarbonate.

However, solutions of nonvolatile salts, such as NaCl or KCl, can also be used. When these salts are used, an additional process step for removal of the salt is necessary in the further procedure of the process according to the invention.

The salt concentration of the dilute egg yolk solution should lie between 0 and 20% by weight, preferably between 1 and 10% by weight, particularly preferably between 2 and 6% by weight, based on the undiluted egg yolk weight used.

To the dilute egg yolk solution is added at least one cyclodextrin in an amount greater than 3% by weight, based on the undiluted egg yolk weight used. The cyclodextrin is intimately mixed with the egg yolk solution. This is achieved, for example, by stirring into the dilute egg yolk solution. This step is preferably carried out at a temperature in the range of 4° C. up to 50° C., particularly preferably at room temperature, which is taken to mean a temperature of about 22° C.

The cyclodextrins which can be used are all cyclodextrins, and also in any desired mixtures thereof.

Those which are suitable are, for example, α-, β- or γ-cyclodextrin.

Those which are preferably suitable are β-cyclodextrin and γ-cyclodextrin.

That which is particularly preferable is γ-cyclodextrin.

The degree of defatting of the egg yolk depends both on the cyclodextrin amount used and also, surprisingly, on the type of cyclodextrin used.

γ-cyclodextrin is preferably used in an amount of 45 to 80% by weight, particularly preferably in an amount of 70 to 80% by weight, based on the undiluted egg yolk weight used.

γ-cyclodextrin is preferably used in an amount of 45 to 150% by weight, particularly preferably in an amount of 90 to 120% by weight, based on the undiluted egg yolk weight used.

The degree of defatting increases with increasing amounts of cyclodextrin. When β-cyclodextrin is used, the maximum possible triglyceride reduction of the egg yolk is achieved by addition of about 80% by weight of β-cyclodextrin, based on the undiluted egg yolk weight used. When γ-cyclodextrin is used, the optimum triglyceride reduction of the egg yolk is achieved by addition of about 120% by weight of γ-cyclodextrin, based on the undiluted egg yolk weight used. Although a further increase of the extraction rate is possible by a further increase in the amount of γ-cyclodextrin added, it is not economically and technologically desirable.

When identical amounts of different cyclodextrins are used, surprisingly, significantly better extraction results are achieved with γ-cyclodextrin, particularly in the concentration range from about 80% by weight, based on the undiluted egg yolk weight used, than are achieved with α- or β-cyclodextrin. Thus, the maximum achievable extraction rate for triglycerides when 120% by weight of γ-cyclodextrin is used is, at approximately 75%, significantly higher than the maximum achievable extraction rate when 80 to 120% by weight of β-cyclodextrin is used (approximately 35%).

The cyclodextrin complex loaded with triglycerides is separated off from the liquid egg yolk mixture by means of known processes for separating solids and liquids. This is preferably effected by centrifugation at preferably 15,000 to 30,000 g for 60 to 120 minutes.

The added water or the aqueous salt solution is preferably removed, to the respective desired extent, by heating to about 60° C. in vacuo. This concentrating method likewise removes the salts which decompose into volatile components on heating.

However, the water or the aqueous salt solution can also equally be removed by other processes, such as by ultrafiltration or reverse osmosis.

When these processes are used, just as when solutions of nonvolatile salts are used, the removal of the salts is necessary by crossflow ultrafiltration or electrodialysis or another process conventional in desalting technology.

The cyclodextrin used can be reused after decomplexing and desorption of the triglycerides. The cyclodextrin is preferably recovered after a decomplexing process conventional in practice, such as by repeated extraction with ethanol of the egg yolk components present in the loaded cyclodextrin complex and subsequent separation of the ethanol-insoluble free cyclodextrin. This is then freed of any undissolved constituents still present by dissolution in hot water and filtration. The cyclodextrin recovered in this manner with a yield of approximately 70 to 90% can be reused for further complexation according to the present invention either in the form of the aqueous solution obtained or in a powder form obtained therefrom by crystallization or spray-drying.

By means of the process according to the invention, mixed glycerol esters containing saturated fatty acids can readily be removed from the egg yolk.

Degrees of defatting as high as required can be achieved by repetition of the process according to the invention.

Subsequent to the process according to the invention, any cyclodextrin residues still present can be removed by processes known per se, such as are described, for example, in U.S. Pat. No. 4,980,180 (equivalent to DE-4,001,611).

Other objects and features of the present invention will become apparent from the following detailed examples, which disclose the embodiments of the present invention. It should be understood, however, that the examples are designed for the purpose of illustration only and not as a definition of the limits of the invention.

DETAILED DESCRIPTION OF PREFERRED EMBODIMENTS

Example 1

100 g of egg yolk (triglyceride content 32% by weight) were diluted with 240 g of distilled water with stirring and simultaneous addition of 8 g of ammonium carbonate. 43 g of β-cyclodextrin were then added to the egg yolk mixture, and the mixture was stirred at room temperature for approximately 4 hours. The cyclodextrin complex formed was then separated from the egg yolk mixture by centrifugation at 4° C. (60 min.; 18,000 g).

The ammonium carbonate and some of the water added were then removed from the egg yolk mixture under vacuum and with heating at 60° C. In order to prevent an excessive concentration of the egg yolk mixture, distilled water at 60° C. was added from time to time and the total volume was adjusted to the initial egg yolk weight of 100 g required at the end. Finally, the residual content of β-cyclodextrin of 0.43 g in the egg yolk mixture (100 g) cooled to 40° C. was completely decomposed within 1 hour, with stirring, by addition of 0.043 g of fungal α-amylase type XA.

The egg yolk obtained in this manner had a triglyceride content of 23.7%. This corresponded to a 26% reduction of the triglyceride content with respect to the untreated egg yolk.

Example 2

100 g of egg yolk (triglyceride content 32% by weight) were diluted with 240 g of distilled water with stirring and simultaneous addition of 8 g of ammonium carbonate. The egg yolk mixture was then treated with 43 g of added γ-cyclodextrin and stirred for approximately 4 hours at room temperature. The γ-cyclodextrin complex formed was then separated from the egg yolk mixture by centrifugation (60 minutes at 4° C. at 18,000 rpm). The ammonium carbonate was then formed completely removed from the egg yolk mixture in approximately 2 hours under vacuum and with heating at 60° C. In order to prevent an excessive concentration of the egg yolk mixture, distilled water at 60° C. was added from time to time and the total volume was adjusted to the initial weight of 100 g required at the end. Finally, by addition of fungal α-amylase type XA (0.1 g of α-amylase per 1 g of γ-cyclodextrin) the residual content of γ-cyclodextrin was completely decomposed within one hour under stirring at 40° C. The egg yolk obtained in this manner had a triglyceride content of 24%. This corresponded to a 25% reduction of the triglyceride content with respect to the untreated egg yolk.

Example 3

100 g of egg yolk, analogously to Example 1, were diluted with 480 g of distilled water, with stirring and addition of 16 g of ammonium carbonate. After addition of 86 g of β-cyclodextrin was completed, the mixture was further stirred for a period of approximately 4 hours and then the complex formed was separated off by centrifugation at 4° C. (60 min.; 18,000 rpm). After the removal of the ammonium carbonate and of the added water by heating in vacuo to 60°–65° C. and the decomposition of the residual β-cyclodextrin content with the aid of α-amylase, the treated egg yolk had a total triglyceride content of 20.7% which corresponds to a 35% reduction.

Example 4

Example 3 was carried out as described above, except that γ-cyclodextrin was used instead of β-cyclodextrin.

The product obtained had a total triglyceride content of 11.5% which corresponds to a 64% decrease of the initial content of triglycerides.

Table 1 reproduces the qualitative analytical results of the triglycerides extracted from the egg yolk, expressed in fatty acid methyl ester contents (% by area), untreated and after the procedure of Example 4. In the table:

C16:0 denotes methyl palmitate;
C16:1 denotes methyl palmitoleate;
C18:0 denotes methyl stearate;
C18:1 denotes methyl oleate;
C18:2 denotes methyl linoleate; and
C18:3 denotes methyl linolenate.

The extracted triglycerides were saponified, the resulting fatty acids were converted into methyl esters, and these were then determined by gas chromatography (values in Table 1 a, b). In addition, the methyl esters were identified by mass spectroscopy (MS).

TABLE 1

| Egg yolk studied | | Fatty acid methyl esters found (Type; contents in % by area) | | | | | |
| --- | --- | --- | --- | --- | --- | --- | --- |
| | | C16:0 | C16:1 | C18:0 | C18:1 | C18:2 | C18:3 |
| Un- | a | 22.3 | 3.1 | 6.8 | 43.2 | 18.1 | 0.6 |
| treated | b | 22.8 | 3.6 | 6.1 | 42.1 | 18.8 | 0.6 |
| egg yolk | MS | 23.7 | 4.7 | 11.5 | 36.0 | 17.5 | 0.8 |
| Treat- | a | 20.8 | — | 5.0 | 47.1 | 27.0 | — |
| ed egg | b | 20.4 | 4.2 | 4.4 | 44.6 | 22.6 | 1.3 |
| yolk (from Ex. 4) | MS | 21.0 | 5.7 | 5.3 | 40.7 | 21.0 | 1.7 |

Example 5

100 g of egg yolk, analogously to Example 1, were diluted with 600 g of distilled water and, after addition of 20 g of ammonium carbonate and 120 g of γ-cyclodextrin, were further stirred for a period of approximately four hours. After the complex formed was separated off by centrifugation and the ammonium carbonate and the added water were removed under vacuum at approximately 60° C., an egg yolk was obtained having a residual triglyceride content of 7.5%. This corresponds to a 76% reduction with respect to the initial product.

The test conditions used in Examples 1 to 5 and results are summarized in Table 2.

TABLE 2

Reduction in the triglyceride content of egg yolk with the aid of β- and γ-cyclodextrin

| | Test conditions and results with β-cyclodextrin (β-CD) and γ-cyclodextrin (γ-CD) | | | | |
| --- | --- | --- | --- | --- | --- |
| | Example 1 | Example 2 | Example 3 | Example 4 | Example 5 |
| Characteristics | β-CD | γ-CD | β-CD | γ-CD | γ-CD |
| Ratio Egg Yolk/CD | 1:0.4 | 1:0.4 | 1:0.8 | 1:0.8 | 1:1.2 |
| Ratio Egg Yolk/H₂O | 1:2.4 | 1:2.4 | 1:4.8 | 1:4.8 | 1:6 |
| Reduction of the triglyceride content (%) | 26 | 26 | 35 | 64 | 76 |

While several embodiments of the present invention have been shown and described, it is to be understood that many changes and modifications may be made thereunto without departing from the spirit and scope of the invention as defined in the appended claims.

What is claimed is:

1. A process for reducing the content of triglycerides in egg yolk and in products containing egg yolk, comprising (a) diluting egg yolk with water or an aqueous salt solution to produce a mixture;

(b) adding γ-cyclodextrin to said mixture to form a γ-cyclodextrin/triglyceride complex; said β-cyclodextrin being used in an amount of 90% to 150% by weight, based on the undiluted egg yolk weight used;

(c) separating off the γ-cyclodextrin/triglyceride complex from said mixture; and (d) separating off to the respective desired extent the added water or the added salt solution from the egg yolk thus treated.

2. The process as claimed in claim 1, comprising
   diluting the egg yolk with said water or said aqueous salt solution in the weight ratio of 1:1 to 1:6, based on the egg yolk weight used.

3. The process as claimed in claim 1,
   wherein the aqueous salt solution used is a solution of salts which decompose into volatile components on heating.

4. The process as claimed in claim 1, comprising using γ-cyclodextrin in an amount of 90 to 120% by weight based upon the undiluted egg yolk weight used.

5. A process for reducing the content of mixed glycerol esters containing saturated fatty acids in egg yolk and in products containing egg yolk, which comprises (a) diluting egg yolk with water or an aqueous salt solution to produce a mixture;

(b) adding γ-cyclodextrin to said mixture to form a γ-cyclodextrin/triglyceride complex; said γ-cyclodextrin being used in an amount of 90% to 150% by weight, based on the undiluted egg yolk weight used;

(c) separating off the γ-cyclodextrin/triglyceride complex from said mixture; and (d) separating off to the respective desired extent the added water or the added salt solution from the egg yolk thus treated.

6. The process as claimed in claim 5, comprising using γ-cyclodextrin in an amount of 90% to 120% by weight.

* * * * *

UNITED STATES PATENT AND TRADEMARK OFFICE
CERTIFICATE OF CORRECTION

PATENT NO. : 5,571,554
DATED : Nov. 5, 1996
INVENTOR(S) : G. DRESSNANDT ET AL

It is certified that error appears in the above-identified patent and that said Letters Patent are hereby corrected as shown below:

Title page, item [73] Assignee: change "Consortium für elektrochemische " to

-- Consortium für elektrochemische Industrie GmbH --

Signed and Sealed this

First Day of April, 1997

BRUCE LEHMAN

Attest:

Attesting Officer

Commissioner of Patents and Trademarks